US006446577B1

(12) United States Patent
Salahor

(10) Patent No.: US 6,446,577 B1
(45) Date of Patent: Sep. 10, 2002

(54) INSULATED COVER FOR PORTABLE KENNEL

(75) Inventor: Brian Kenneth Salahor, Calgary (CA)

(73) Assignee: Brian K Salahor, Calgary (CA)

( * ) Notice: Subject to any disclaimer, the term of this patent is extended or adjusted under 35 U.S.C. 154(b) by 0 days.

(21) Appl. No.: 09/568,980

(22) Filed: May 11, 2000

(51) Int. Cl.7 .......................... A01K 1/00; A01K 31/06
(52) U.S. Cl. ....................................... 119/497; 119/470
(58) Field of Search ................................. 119/452, 470, 119/482, 496, 497

(56) References Cited

U.S. PATENT DOCUMENTS

| | | | | |
|---|---|---|---|---|
| 1,015,766 A | * | 1/1912 | Stone ........................ 119/470 |
| 4,803,951 A | | 2/1989 | Davis ........................ 119/497 |
| 4,947,794 A | * | 8/1990 | Baldwin .................... 119/470 |
| 5,072,694 A | | 12/1991 | Hayes et al. ............... 119/482 |
| 5,078,096 A | | 1/1992 | Bishop et al. ............. 119/497 |
| 5,465,686 A | | 11/1995 | Monetti et al. ............ 119/168 |
| 5,485,805 A | | 1/1996 | Meissner ................... 119/497 |
| 5,881,678 A | | 3/1999 | Morley ...................... 119/496 |
| 5,954,014 A | * | 9/1999 | Wamsley ................... 119/497 |
| 6,055,937 A | * | 5/2000 | Korpi ........................ 119/470 |
| 6,062,169 A | * | 5/2000 | Wade et al. ............... 119/497 |
| 6,082,305 A | * | 7/2000 | Burns et al. .............. 119/497 |

* cited by examiner

Primary Examiner—Charles T. Jordan
Assistant Examiner—Elizabeth Shaw

(57) ABSTRACT

Animal owners frequently find themselves in a position of needing to transport their pets, either by auto or by commercial carrier, using a portable kennel. During cold weather, confinement in such a kennel offers the animal little protection against the cold. Additionally, the confining nature of such kennels gives an animal little opportunity to move around to generate the body heat necessary to stay warm. The present invention is an insulated cloth cover for a portable kennel which provides full insulation of all side, top and bottom, such that an animal can be shipped during cold weather without concerns about exposure to the cold.

21 Claims, 7 Drawing Sheets

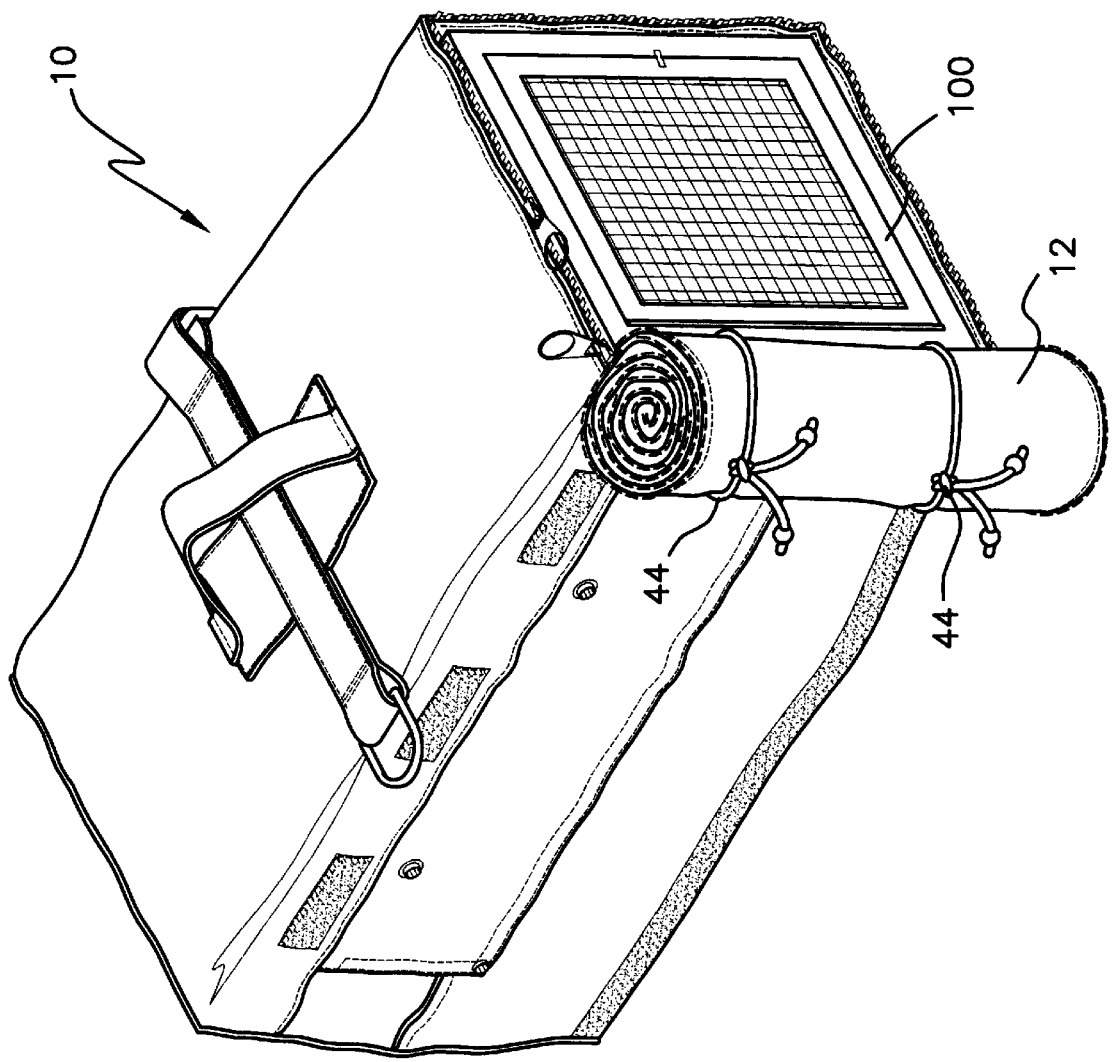

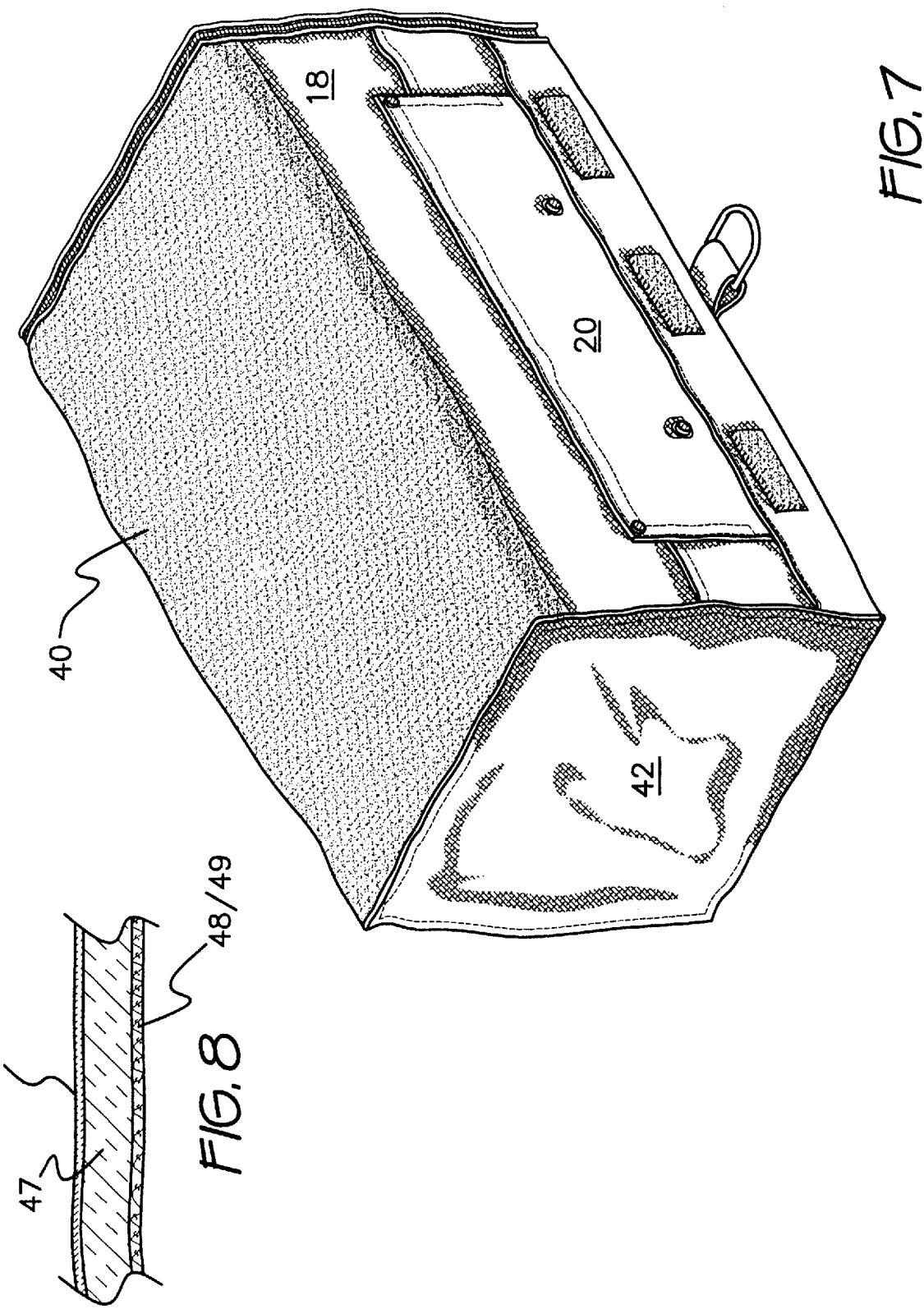

INSULATED COVER FOR PORTABLE KENNEL

BACKGROUND OF THE INVENTION

1. Field of the Invention

The present invention relates to travel with, or other temporary confinement of, small animals. More particularly, the invention comprises an insulated cloth cover for travel kennels as are typically used when transporting animals by auto or commercial carrier.

2. Description of the Prior Art

Animal owners frequently find themselves in a position of needing to transport their pets, either by auto or by commercial carrier, using a portable kennel. During cold weather, confinement in such a kennel offers the animal little protection against the cold. Additionally, the confining nature of such kennels gives an animal little opportunity to move around to generate the body heat necessary to stay warm.

Prior art indicates several cloth carriers, with most of these intended solely as a method of confinement and protection from rain, offering little insulation from the cold.

U.S. Pat. No. 5,899,678, issued to Patrick R. Morley on Mar. 16, 1999, relates to an insulated cover for a portable dog kennel. Morley's cover, constructed of an insulating cloth, provides full coverage of the front, back, sides and top of said kennel, with the bottom being comprised of strip of cloth around the perimeter thereof and a strip of webbing permanently affixed proximate center of one side and secured by a fastener proximate center of the opposite side, said strap securing said cover to the kennel. The front and sides of said cover contain flaps, which may be opened to allow ventilation through openings in the material of the cover. While Morley provides the benefit of insulation to the front, back, sides and top of a kennel, unlike the present invention, it leaves the bottom uninsulated. Also, unlike the present invention Morley's window openings are not reinforced with mesh, reducing the integrity of the cut surface. Morley also provides no integral means of carrying the kennel or tie down support while said cover is installed on a kennel, as does the present invention.

U.S. Pat. No. 5,078,096, issued to Delena K. Bishop, et. al., on Jan. 7, 1992, relates to a collapsible container for housing and carriage of pets, which has a rigid, square base and pyramidal, cloth wall structures supported by a collapsible, semi-rigid rod frame. At the apex of said pyramidal walls is a cloth, looped handle strap for carrying said collapsible container. Unlike the present invention, Bishop provides no insulation against the cold and no rigid kennel housing for shipment wherein kennels might be stacked.

U.S. Pat. No. 4,803,951, issued to L. Dan Davis on Feb. 14, 1989, refers to a collapsible enclosure for pets, comprising a collapsible framework covered by a cloth structure, the top portion of which being of mesh and the lower portion of waterproof material. Said enclosure has no rigidity for carrying, providing only confinement, as in the rear of an auto, and provides no insulating protection, as does the present invention.

U.S. Pat. No. 5,465,686, issued to Steven A. Monetti, et. al., on Nov. 14, 1995 refers to a collapsible house for pets, comprising a single piece, collapsible box of a material such as cardboard. The collapsible box has a front and rear wall with a truncated gable, to side walls with one side of the roof integrated into each and a flap for connecting the two roof panels integrated into one of said sides. In the erected state, all sides are connected via interlocking slots and tabs. Said collapsible box could be used for confinement of a pet in transit, but does not allow for carrying, stacking or insulating, as does the present invention.

U.S. Pat. No. 5,485,805, issued to Jay P. Meissner on Jan. 23, 1996, relates to a cover for pet carrier, comprising a hood which can be placed over the top of a commercially available portable kennel to convert it to an outdoor shelter. Said cover, which mounts directly on the top of said portable kennel provides awnings to extend out over the tops of the side vents and door of said kennel to shed water away from said openings. Unlike the present invention, however, Meissner's cover provides no insulating benefit.

U.S. Pat. No. 5,072,694, issued to William A. Haynes, et. al., on Dec. 17, 1991, relates to a pet bed and enclosure, specifically designed for cats, comprising a semi-rigidly framed cloth enclosure with cloth floor. The enclosure is suspended above a square framed base by a pair of springs. The enclosure is designed solely as a cat bed, and while it could conceivably be used as such, provides no real benefit as a transport device, as does the present invention.

None of the above inventions and patents, taken either singly or in combination, is seen to describe the instant invention as claimed.

SUMMARY OF THE INVENTION

The present invention provides a method of providing the added protection of insulation to a portable kennel, such that an animal can be shipped during cold weather without concerns about exposure to the cold.

Animal owners frequently find themselves in a position of needing to transport their pets, either by auto or by commercial carrier, using a portable kennel. During cold weather, confinement in such a kennel offers the animal little protection against the cold. Additionally, the confining nature of such kennels gives an animal little opportunity to move around to generate the body heat necessary to stay warm.

Accordingly, it is a principal object of the invention to provide a cover for a portable kennel.

It is another object of the invention to provide an insulated cover for a portable kennel.

It is a further object of the invention to provide a cover for a portable kennel wherein flaps are provided which may be opened or closed to allow or prevent ventilation through the door and vent openings of the kennel.

Yet another object of the invention is to provide a means of opening ventilating flaps to varying degrees in order control the amount of ventilation provided.

Still another object of the invention is to provide a cover for a portable kennel with a waterproof bottom panel.

An additional object of the invention is to provide a cover for a portable kennel wherein a handle is provided for carrying the kennel.

It is again an object of the invention to provide a cover for a portable kennel wherein provisions are made for securing the kennel firmly to the ground or other anchor.

Still another object of the invention is to provide a kennel cover which can be easily installed or removed from its associated rigid kennel.

Another object of the invention is to provide a cover which is appropriately configured to fit around a variety of kennel sizes.

It is a final object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 6 is an environmental perspective of the invention showing the door end and left side, with the door flap in the open position and side window flap in the closed position.

FIG. 7 is an environmental perspective of the invention showing the back, bottom and right side of the invention.

FIG. 8 is a cross sectional view of the insulated material of which the cover is constructed.

DETAILED DESCRIPTION OF THE PREFERRED EMBODIMENTS

Figure 1:
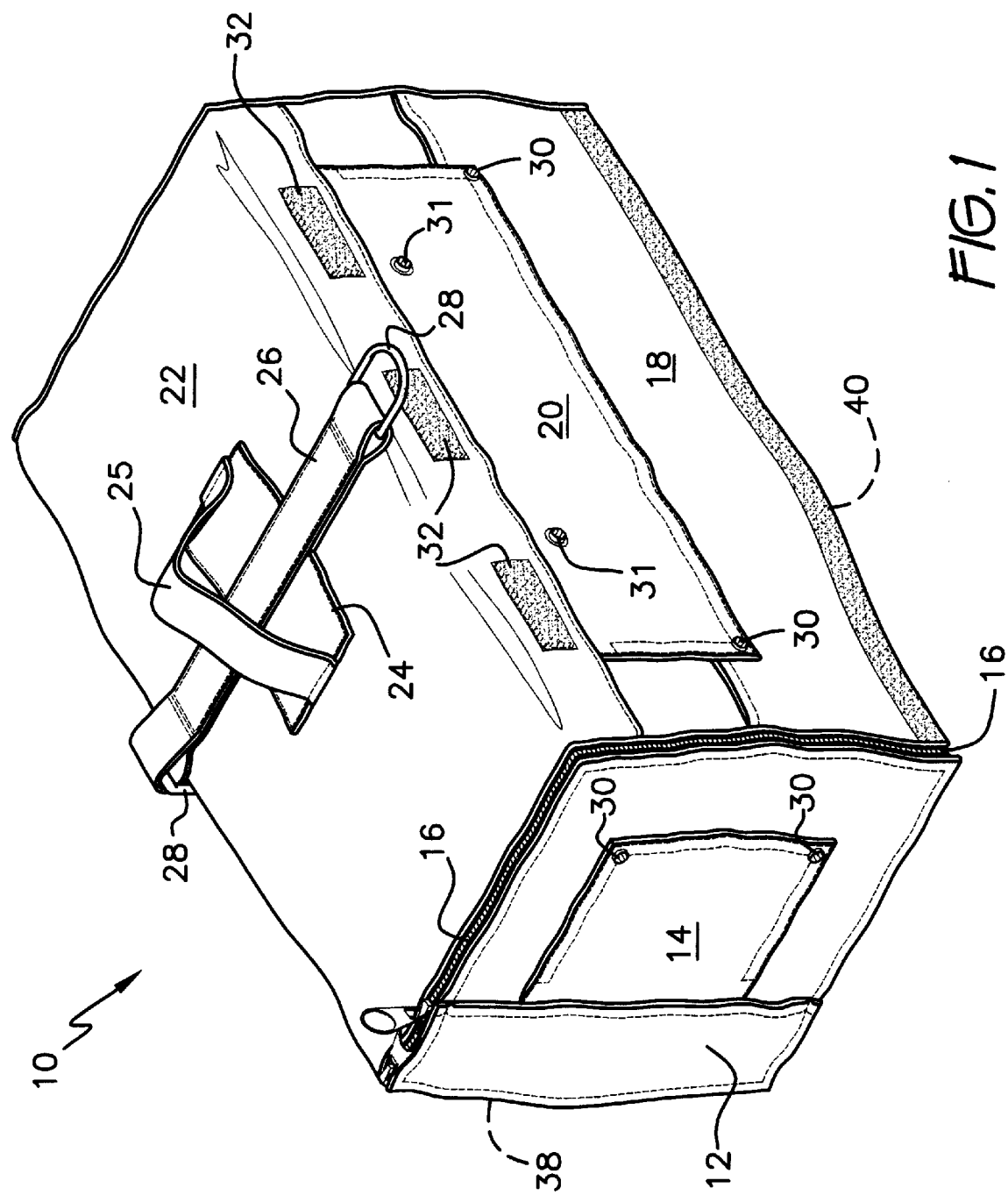
FIG. 1 is an environmental perspective of the invention showing the door end and right side, with door flap, door window flap and side window flap in the closed position.
Figure 4:
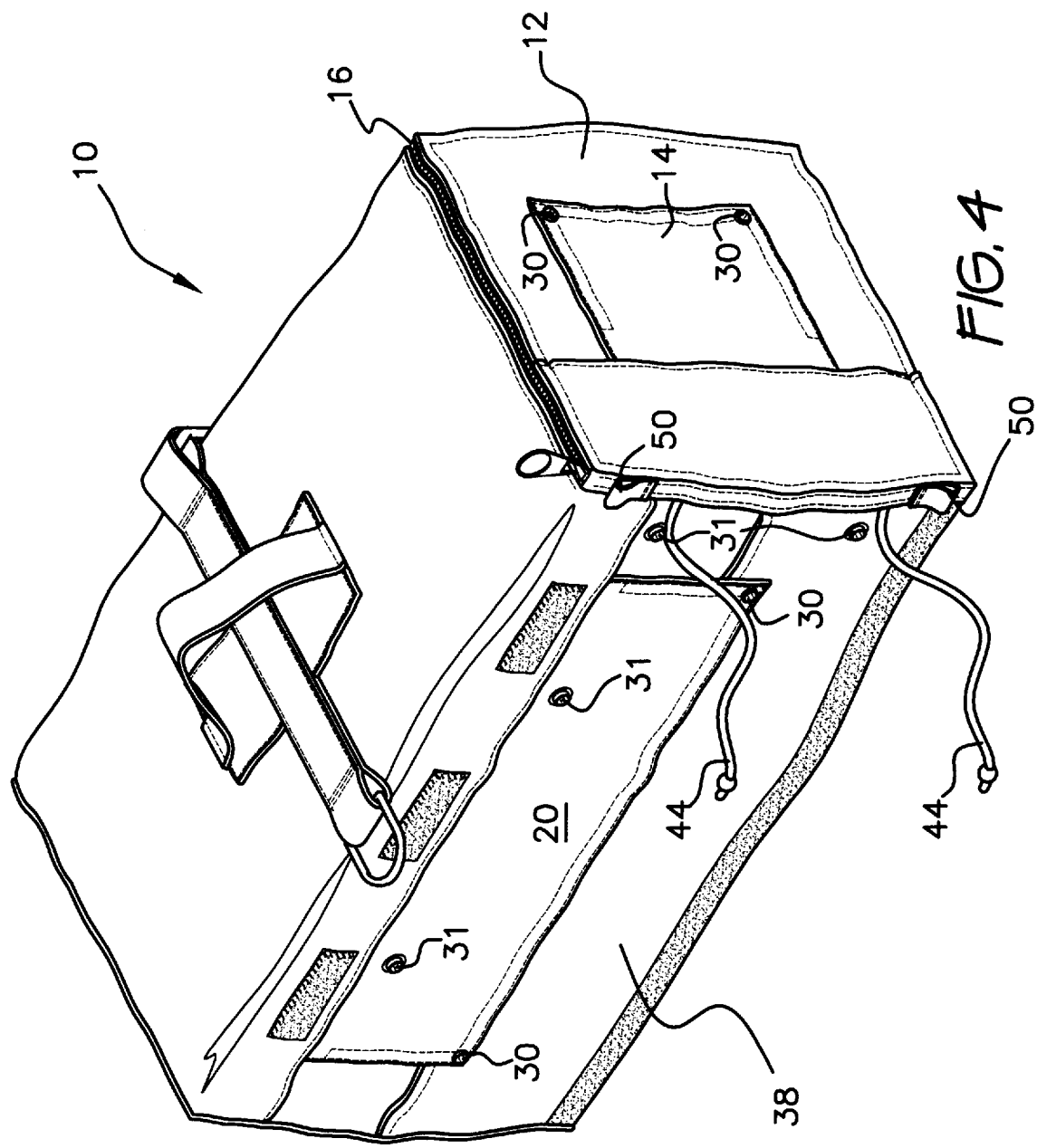
FIG. 4 is an environmental perspective of the invention showing the door end and left side, door flap, door window flap and side window flap in the closed position.

The insulated cover 10 for portable kennel 100 is comprised of a front door flap 12, right side 18, left side 38, back 42, top 22, and bottom 40, as shown in FIGS. 1, 4, and 7.

As shown in FIG. 1, door flap 12 is affixed to left side 38 by means of a sewn seam. Zipper 16 provides closure of door flap 12 along its juncture with top 22, right side 18 and bottom 40. Within door flap 12 is door window flap 14, permanently affixed along its left edge to door flap 12 with a sewn seam. Located proximate the upper and lower right hand corners of door window flap 14 are snap fasteners (female) 30.

Figure 2:
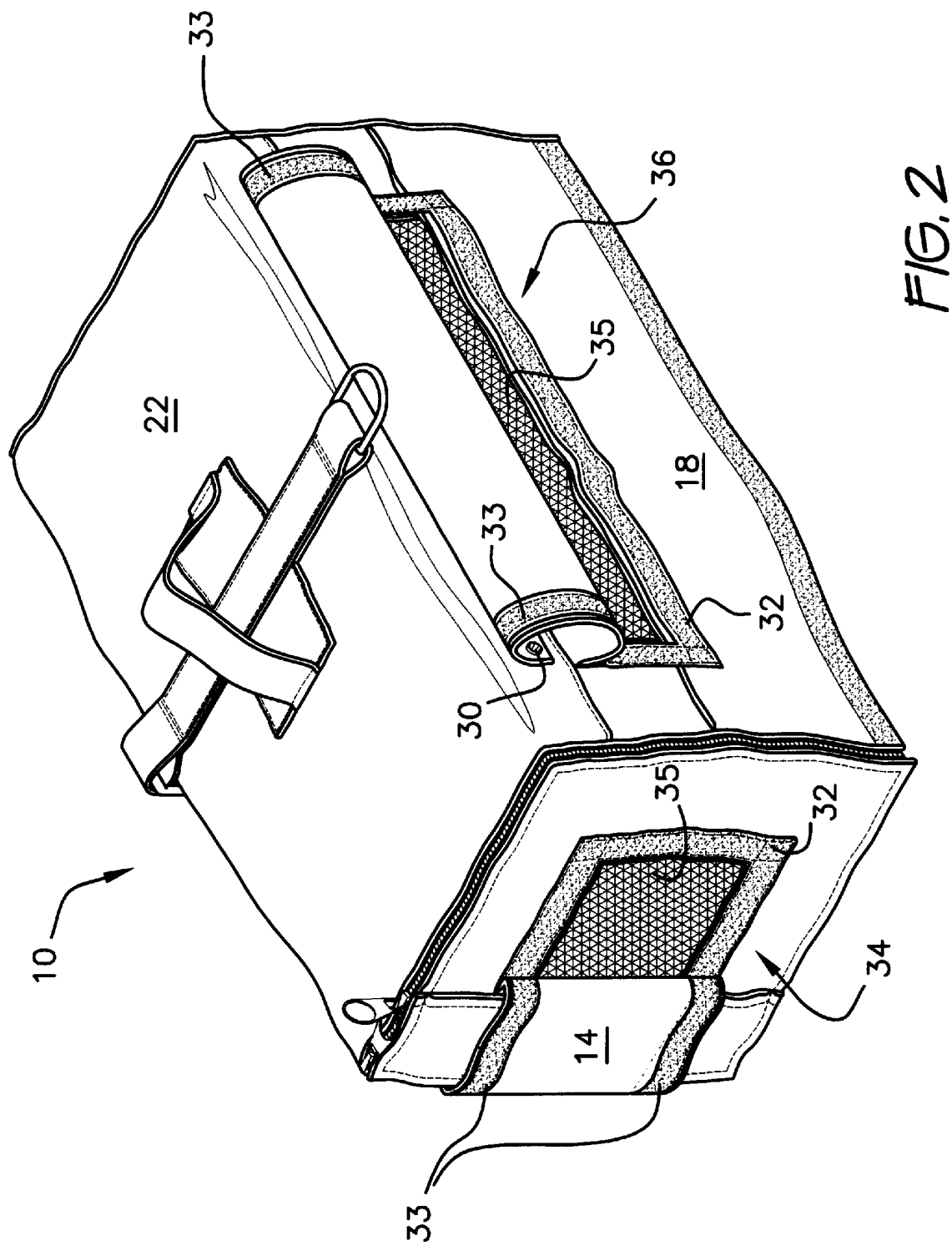
FIG. 2 is an environmental perspective of the invention showing the door end and right side, with door flap closed, the door window flap and side window flap in the open position.
Figure 3:
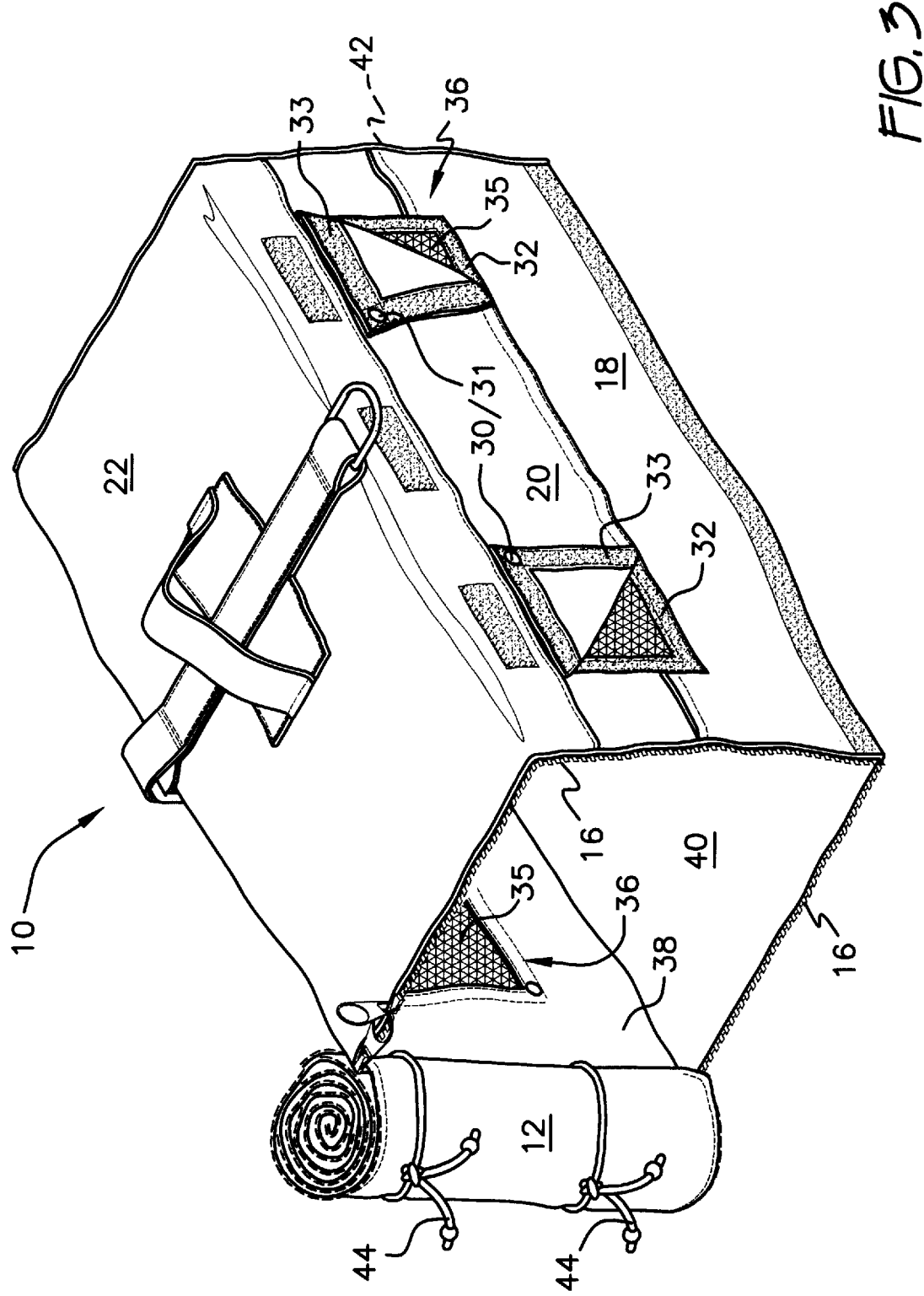
FIG. 3 is an environmental perspective of the invention showing the door end and right side, the door open and the side window flap in the partially open position.
Figure 5:
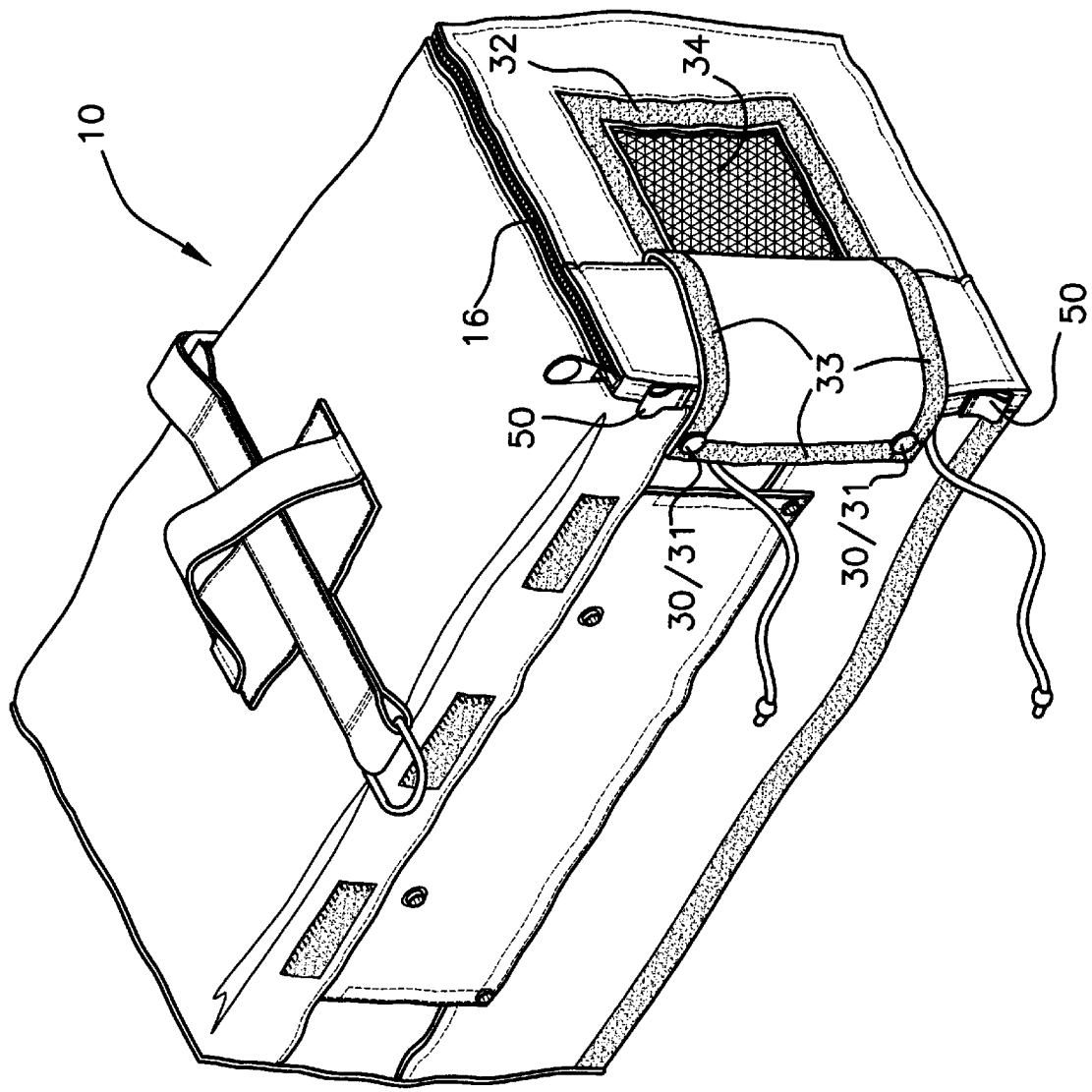
FIG. 5 is an environmental perspective of the invention showing the door end and left side, door and side window flap closed and door window flap in the open position.

Door window flap 14 is secured in a closed position by a plurality of loop fasteners 32 affixed along the free edges of the inner surface of door window flap 14 and hook fasteners 33 along the corresponding surfaces of door flap 12, as shown in FIG. 2. Door window flap 14 can be secured in an open position, as shown in FIGS. 2 and 5, by engaging the snap fasteners (female) 30 in the corners of door flap 14 with snap fasteners (male) 31 located on the edge of left side 38 proximate its side abutting door flap 12, as shown in FIG. 4. Door flap 12 can be secured in the open position, as shown in FIGS. 3 and 6, by rolling it back and securing it with tie backs 44 which are secured in the inner and outer surface of the seam created by the juncture of door flap 12 and left side 38. Tab 50 may be used to stabilize insulated cover 10 while zipping or unzipping door flap 12.

Within right side 18 and left side 38 are window flaps 20, permanently affixed along their upper edges to right side 18 and left side 38 with sewn seams. Located within window flaps 20 proximate each lower corner are snap fasteners (female) 30. Also located within window flap 20 are snap fasteners (male) 31, at a point a distance from the right and left upper corners of window flap 20 equal to the distance from the right and left upper corners to the snap fastener (female) 30 at the corresponding lower corner. Side window flaps 20 are secured in a closed position by a plurality of loop fasteners 32 affixed along the free edges of the inner surface of side window flaps 20 and hook fasteners 33 affixed along the corresponding surfaces of right side 18 and left side 38, as shown in FIG. 2. Above side window flaps 20 are a plurality of loop fasteners 32. Side window flaps 20 may be secured in the fully open position by folding them up twice and engaging the hook fasteners 33 along their lower edge with the loop fasteners 32 located above side window flaps 20, as shown in FIG. 2. Side window flaps 20 may be secured in a partially open position in order to provide a lesser amount of ventilation than that a fully open position affords by engaging the snap fasteners (female) 30 at the lower corners with the snap fasteners (male) 31 located along the top edge of side window flaps 20 while keeping the center portion of side window flap 20 secured by the hook fastener 33 and loop fastener 32 along the center portion of its lower edge, as shown in FIG. 3.

The voids created by door window 34 and side windows 36 is covered by a suitable window mesh 35 material.

As shown in FIG. 1, cloth reinforcing panel 24, is sewn into center of top 22. Reinforcing strap 26 is sewn to the fabric of top 22, parallel to a central axis between side 18 and side 38. D rings 28 are secured at the opposite ends of reinforcing strap 26 by loops created by folding the fabric of reinforcing strap 26 under prior to stitching reinforcing strap 26 to top 22. Carrying handle 25 is secured to the opposite ends of reinforcing panel 24. In covers for larger portable kennels, multiple handles 25 are provided.

FIG. 7 shows bottom 40, back 42, right side 18 and side window flap 20.

FIG. 8 shows a cross section of the insulated fabric of which the cover is manufactured. Throughout the cover, liner 46 is composed of nylon and insulation 47 is composed of a poly-fiber fill. Outer shell 48 of the upper portions of the cover is composed of a semi water repellant serge cloth. Bottom panel 49 is composed of a heavy duty, waterproofed canvas.

Insulated cover 10 can easily be fitted over portable kennel 100 through the door opening created when door flap 12 is rolled back, as in FIG. 6.

It would be evident to one skilled in the art that the fasteners used could be of a variety of types, as could the cloths used for the construction of the upper portions and the bottom of the cover. In like manner, it would be evident to one skilled in the art that the mesh material used in screening the windows could be of a variety of types. it would likewise be evident to one skilled in the art that the insulated cover could be sized to fit kennels of differing dimensions.

It is to be understood that the present invention is not limited to the embodiments described above, but encompasses any and all embodiments within the scope of the following claims.

I claim:

1. An insulated cloth cover in combination with a portable kennel comprising;

said kennel having a rigid body consisting of a front with a door to allow ingress and egress of an animal therefrom, a top, a floor, a back, and a right and left sides, with said kennel having windows in at least one of said door and side thereof, and said insulated cloth cover comprising;
- a top,
- a bottom, fully covering the bottom of said floor of said kennel,
- a back,
- a right and left side
- and a front containing a door flap which may be opened for placing said portable kennel therein and allowing ingress and egress of an animal from said portable kennel,
- said door flap being secured in the open and closed positions by fastening devices
- said insulated cloth cover sized to fit said portable kennel,
- said flaps are secured in either the closed or fully open position by a hook and loop fastener,
- said flaps may further be secured by snap fasteners in an intermediate open position providing a lesser amount of ventilation than when in the fully open position.

2. An insulated cloth cover as defined in claim 1 wherein said device for securing said door flap in a closed position comprises a zipper.

3. An insulated cloth cover as defined in claim 1 wherein said device for securing said door flap in an open position comprises a pair of inner and outer tie back ropes secured in the seam of juncture between said door flap and one of said sides.

4. An insulated cloth cover as defined in claim 1, wherein the bottom is waterproof.

5. An insulated cloth cover as defined in claim 1, wherein window openings are cut in said door flap and said right and left sides.

6. An insulated cloth cover as defined in claim 5, wherein window mesh covers the void created by said window openings.

7. An insulated cloth cover as defined in claim 5, wherein covering flaps are provided for opening and closing said windows to control ventilation of said portable kennel.

8. An insulated cloth cover as defined in claim 1, wherein at least one handle for carrying said kennel is incorporated into the top of said cover.

9. An insulated cloth cover for a portable kennel, said kennel having a rigid body consisting of a front with a door to allow ingress and egress of an animal therefrom, a top, a floor, a back, and a right and left side, and said kennel having windows in at least one of said door and sides thereof, comprising;
- a top,
- a bottom, fully covering the bottom of said floor of said kennel,
- a back,
- a right and left side
- and a front containing a door flap which may be opened for placing said portable kennel therein and allowing ingress and egress of an animal from said portable kennel,
- said door flap being secured in the open and closed positions by fastening devices,
- said insulated cloth cover sized to fit said portable kennel,
- covering flaps are provided for opening and closing said windows to control ventilation of said portable kennel and wherein said flaps are secured in either the closed or fully open position by a hook and loop fastener,
- said flaps may be further secured by snap fasteners in an intermediate open position providing a lesser amount of ventilation than when in the fully open position.

10. An insulated cloth cover as defined in claim 9 wherein said device for securing said door flap in a closed position comprises a zipper.

11. An insulated cloth cover as defined in claim 9, wherein window openings are cut in said door flap and said right and left sides and window mesh covers the void created by said window openings.

12. An insulated cloth cover as defined in claim 9, wherein at least one handle for carrying said kennel is incorporated into the top of said cover.

13. An insulated cloth cover for a portable kennel comprising;
- a top,
- a bottom,
- a bottom, fully covering the bottom of said floor of said kennel,
- a back,
- a right and left side
- and a front containing a door flap which may be opened for placing said portable kennel therein and allowing ingress and egress of an animal from said portable kennel,
- a zipper for securing said door flap in a closed position,
- means for securing said door flap in an open position comprising a pair of inner and outer tie back ropes secured in the seam of juncture between said door flap and one of sides,
- and wherein windows openings are cut in said door flap and said right and left sides, wherein
- window mesh covers the void created by said windows openings
- covering flaps are provided for opening and closing said windows to allow ventilation of said portable kennel,
- said flaps are secured in the closed position by a hook and loop fastener, and
- said flaps are secured in the fully open position by a hook and loop fastener, and
- said flaps are secured in an intermediate open position by a set of snap fasteners, providing a lesser amount of ventilation than when in the fully open position,
- and wherein at least one handle for carrying said kennel is incorporated into the top of said cover,
- and wherein D rings for securing said kennel to a secure anchorage are provided.

14. An insulated cloth cover in combination with a portable kennel comprising;
- said kennel having a rigid body consisting of a front with a door to allow ingress and egress of an animal therefrom, a top, a floor, a back, and a right and left sides, with said kennel having windows in at least one of said door and side thereof, and
- said insulated cloth cover comprising;
  - a top,
  - a bottom, fully covering the bottom of said floor of said kennel,
  - a back,
  - a right and left side
  - and a front containing a door flap which may be opened for placing said portable kennel therein and allowing ingress and egress of an animal from said portable kennel, said door flap being secured in the open and closed positions by fastening devices said insulated cloth cover sized to fit said portable kennel, D rings for securing said kennel to the ground or other anchorage are provided.

15. An insulated cloth cover for a portable kennel, said kennel having a rigid body consisting of a front with a door to allow ingress and egress of an animal therefrom, a top, a floor, a back, and a right and left side, and said kennel having windows in at least one of said door and sides thereof, comprising;

a top, a bottom, fully covering the bottom of said floor of said kennel, a back, a right and left side and a front containing a door flap which may be opened for placing said portable kennel therein and allowing ingress and egress of an animal from said portable kennel, said door flap being secured in the open and closed positions by fastening devices, said insulated cloth cover sized to fit said portable kennel, D rings for securing said kennel to the ground or other anchorage are provided.

16. An insulated cloth cover in combination with a portable kennel comprising;

said kennel having a rigid body consisting of a front with a door to allow ingress and egress of an animal therefrom, a top, a floor, a back, and a right and left sides, with said kennel having windows in at least one of said door and side thereof, and said insulated cloth cover comprising;

a top, a bottom, fully covering the bottom of said floor of said kennel, a back, a right and left side and a front containing a door flap which may be opened for placing said portable kennel therein and allowing ingress and egress of an animal from said portable kennel, said door flap being secured in the open and closed positions by fastening devices said insulated cloth cover sized to fit said portable kennel, said door flap having a window openable and closable by a door window flap, and said door window flap can be secured in an open position by snap fasteners, said right side and said left side each having a window closeable and openable by a window flap which is secured in an open position by fasteners.

17. An insulated cloth cover for a portable kennel, said kennel having a rigid body consisting of a front with a door to allow ingress and egress of an animal therefrom, a top, a floor, a back, and a right and left side, and said kennel having windows in at least one of said door and sides thereof, comprising;

a top, a bottom, fully covering the bottom of said floor of said kennel, a back, a right and left side and a front containing a door flap which may be opened for placing said portable kennel therein and allowing ingress and egress of an animal from said portable kennel, said door flap being secured in the open and closed positions by fastening devices, said insulated cloth cover sized to fit said portable kennel, said door flap having a window openable and closable by a door window flap, and said door window flap can be secured in an open position by snap fasteners, said right side and said left side each having a window closeable and openable by a window flap which is secured in an open position by fasteners.

18. An insulated cloth cover in combination with a portable kennel comprising;

said kennel having a rigid body consisting of a front with a door to allow ingress and egress of an animal therefrom, a top, a floor, a back, and a right and left sides, with said kennel having windows in at least one of said door and side thereof, and said insulated cloth cover comprising;

a top, a bottom, fully covering the bottom of said floor of said kennel, a back, a right and left side and a front containing a door flap which may be opened for placing said portable kennel therein and allowing ingress and egress of an animal from said portable kennel, said door flap being secured in the open and closed positions by fastening devices said insulated cloth cover sized to fit said portable kennel, said door flap has a door flap window, and said right and left sides each having a side window all covered by a mesh.

19. An insulated cloth cover for a portable kennel, said kennel having a rigid body consisting of a front with a door to allow ingress and egress of an animal therefrom, a top, a floor, a back, and a right and left side, and said kennel having windows in at least one of said door and sides thereof, comprising;

a top, a bottom, fully covering the bottom of said floor of said kennel, a back, a right and left side and a front containing a door flap which may be opened for placing said portable kennel therein and allowing ingress and egress of an animal from said portable kennel, said door flap being secured in the open and closed positions by fastening devices, said insulated cloth cover sized to fit said portable kennel, said door flap being secured in the open and closed positions by fastening devices said insulated cloth cover sized to fit said portable kennel, said door flap has a door flap window, and said right and left sides each having a side window all covered by a mesh.

20. An insulated cloth cover in combination with a portable kennel comprising;

said kennel having a rigid body consisting of a front with a door to allow ingress and egress of an animal therefrom, a top, a floor, a back, and a right and left sides, with said kennel having windows in at least one of said door and side thereof, and said insulated cloth cover comprising;
- a top,
- a bottom, fully covering the bottom of said floor of said kennel,
- a back,
- a right and left side
- and a front containing a door flap which may be opened for placing said portable kennel therein and allowing ingress and egress of an animal from said portable kennel,
- said door flap being secured in the open and closed positions by fastening devices
- said insulated cloth cover sized to fit said portable kennel,
- a close reinforcing panel attached to a center of the top,
- a carrying handle secured to the reinforcing plane; and
- a reinforcing strap affixed to the top and located under the carrying handle.

21. An insulated cloth cover for a portable kennel, said kennel having a rigid body consisting of a front with a door to allow ingress and egress of an animal therefrom, a top, a floor, a back, and a right and left side, and said kennel having windows in at least one of said door and sides thereof, comprising;
- a top,
- a bottom, fully covering the bottom of said floor of said kennel,
- a back,
- a right and left side
- and a front containing a door flap which may be opened for placing said portable kennel therein and allowing ingress and egress of an animal from said portable kennel,
- said door flap being secured in the open and closed positions by fastening devices,
- said insulated cloth cover sized to fit said portable kennel, said door flap being secured in the open and closed positions by fastening devices
- said insulated cloth cover sized to fit said portable kennel,
- a close reinforcing panel attached to a center of the top,
- a carrying handle secured to the reinforcing pane; and
- a reinforcing strap affixed to the top and located under the carrying handle.

* * * * *